United States Patent

DiBella

[11] Patent Number: 6,019,574
[45] Date of Patent: Feb. 1, 2000

[54] MISMATCH PROOF VARIABLE STATOR VANE

[75] Inventor: Joseph DiBella, West Roxbury, Mass.

[73] Assignee: General Electric Company, Cincinnati, Ohio

[21] Appl. No.: 09/133,188

[22] Filed: Aug. 13, 1998

[51] Int. Cl.[7] .............................. F01B 25/02; F03B 1/04
[52] U.S. Cl. ................................. 415/160; 415/148
[58] Field of Search .................................... 416/147, 148, 416/149; 415/148, 149.1, 149.2, 151, 159, 160, 162

[56] References Cited

U.S. PATENT DOCUMENTS

| | | | |
|---|---|---|---|
| 4,214,852 | 7/1980 | Tuley et al. ........................ | 415/159 X |
| 4,514,141 | 4/1985 | Marey ................................ | 415/160 |
| 4,585,390 | 4/1986 | Pirtle et al. ...................... | 415/160 |
| 5,061,152 | 10/1991 | Marey ............................... | 415/159 X |
| 5,492,446 | 2/1996 | Hawkins et al. ................. | 415/160 |
| 5,636,968 | 6/1997 | Audet et al. ..................... | 415/160 |
| 5,795,128 | 8/1998 | Eichstadt ......................... | 415/160 |

*Primary Examiner*—John E. Ryznic
*Attorney, Agent, or Firm*—Andrew C. Hess; Nathan D. Herkamp

[57] ABSTRACT

A variable stator vane includes an airfoil having a threaded stem, a lever having a mounting hole receiving the stem, and a nut threadingly engaging the stem to retain the lever on the airfoil. A clearance is provided between the seat and lever during alignment therebetween to provide sufficient thread overlap between the nut and stem to permit engagement therebetween, with insufficient thread overlap being provided during misalignment to prevent threaded engagement therebetween.

10 Claims, 3 Drawing Sheets

MISMATCH PROOF VARIABLE STATOR VANE

BACKGROUND OF THE INVENTION

The present invention relates generally to gas turbine engines, and, more specifically, to variable stator compressor vanes.

A typical gas turbine engine compressor includes several rows or stages of compressor stator vanes and corresponding rows or stages of compressor rotor blades therebetween. During operation, air is sequentially compressed in the compressor stages and channeled to a combustor for being mixed with fuel and ignited for generating hot combustion gases which power the engine.

Compressor performance is improved by providing variable stator vanes which are selectively rotated about their longitudinal or radial axes. This is accomplished by attaching a corresponding lever arm to the radially outer ends of the vanes and joining the several levers to a common actuation or unison ring for providing uniform adjustment of the individual vanes to maximize compressor performance.

Each of the variable vanes must be identically angled relative to the other vanes in the row to maximize efficiency and prevent undesirable aerodynamic distortion from a misaligned stator vane.

In order to ensure proper alignment of the individual stator vanes, each vane typically includes a generally D-shaped seat around which a complementary D-shaped mounting hole of the lever is positioned. A threaded stem extends from the seat and receives a nut which secures the individual levers to the corresponding vanes.

The lever mounting holes and corresponding vane seats are typically sized with close manufacturing tolerances to ensure accurate coordination of the rotary positions of the vanes during operation. For example, the flat parallel sides of the seat and mounting hole are typically sized with a line-to-line clearance which is nominally a zero clearance plus or minus a suitable manufacturing tolerance. Statistically, this means that some levers will have a positive clearance around their seats and are readily seated thereon, and some levers will have a negative clearance around their seats which requires a corresponding assembly force resulting in a tight interference fit with their seats.

The interference fit is typically effected by simply threadingly engaging the retaining nut atop the threaded stem and torquing the nut sufficiently to drive the lever downwardly around its seat in an interference fit therewith. This, however, presents the problem of plastically damaging either the lever or its seat in the event of misalignment therebetween.

Since the mounting hole of a lever in the interference fit example cannot initially engage its corresponding seat, when the nut is initially threaded atop the exposed portion of the stem it hides from view the D-shaped interface between the mounting hole and its seat. If the lever is misaligned atop its seat and the nut is nevertheless torqued into engagement, undesirable plastic deformation around the mounting hole or seat, or both, can occur requiring replacement of either or both components.

Accordingly, it is desired to provide an improved variable stator vane which prevents mismatch assembly between the lever atop its mounting seat.

BRIEF SUMMARY OF THE INVENTION

A variable stator vane includes an airfoil having a threaded stem, a lever having a mounting hole receiving the stem, and a nut threadingly engaging the stem to retain the lever on the airfoil. A clearance is provided between the seat and lever during alignment therebetween to provide sufficient thread overlap between the nut and stem to permit engagement therebetween, with insufficient thread overlap being provided during misalignment to prevent threaded engagement therebetween.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
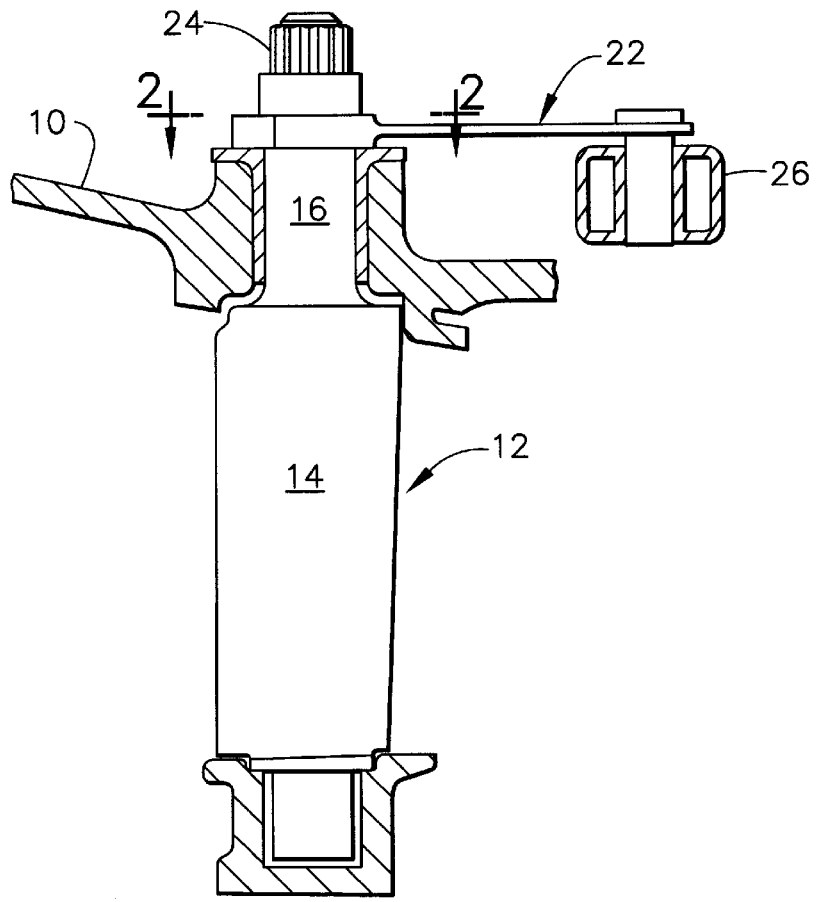
FIG. 1 is a partly sectional, elevational view of a variable stator compressor vane mounted in a multistage axial compressor of a gas turbine engine in accordance with an exemplary embodiment of the present invention.

Illustrated in FIG. 1 is a portion of an annular stator casing 10 of an exemplary multistage axial compressor for a gas turbine engine to which is mounted a plurality of circumferentially spaced apart compressor variable stator vanes 12. Each vane includes an airfoil 14 conventionally including a leading edge, trailing edge, and pressure and suction sides extending therebetween.

Each vane further includes a radially outer trunnion 16 extending coaxially and integrally outwardly from the top of the airfoil for pivotally mounting the airfoil in a corresponding bushing in the casing in a conventionally known manner. In the exemplary embodiment illustrated, the vane also includes a radially inner trunnion mounted in a sealing ring, although in other embodiments they may not be used.

Figure 2:
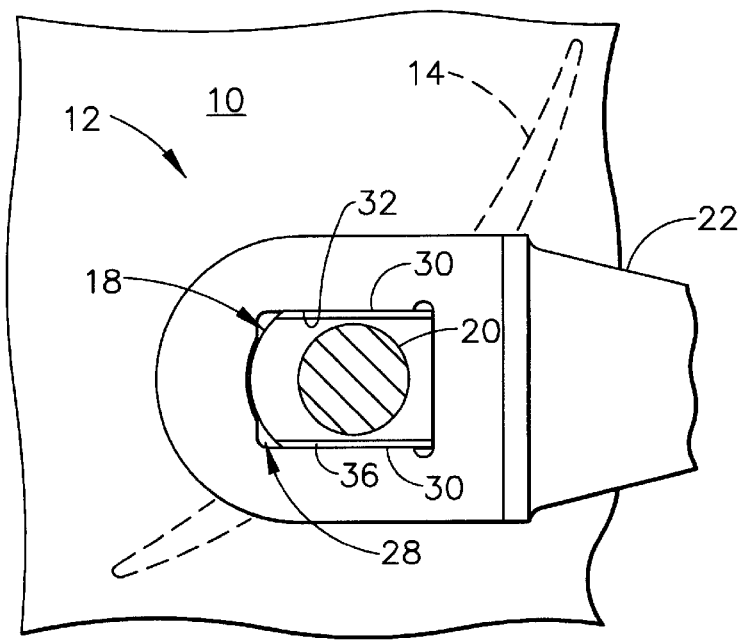
FIG. 2 is a top, partly sectional view through a mounting portion of the variable vane illustrated in FIG. 1 and taken along line 2—2.
Figure 3:
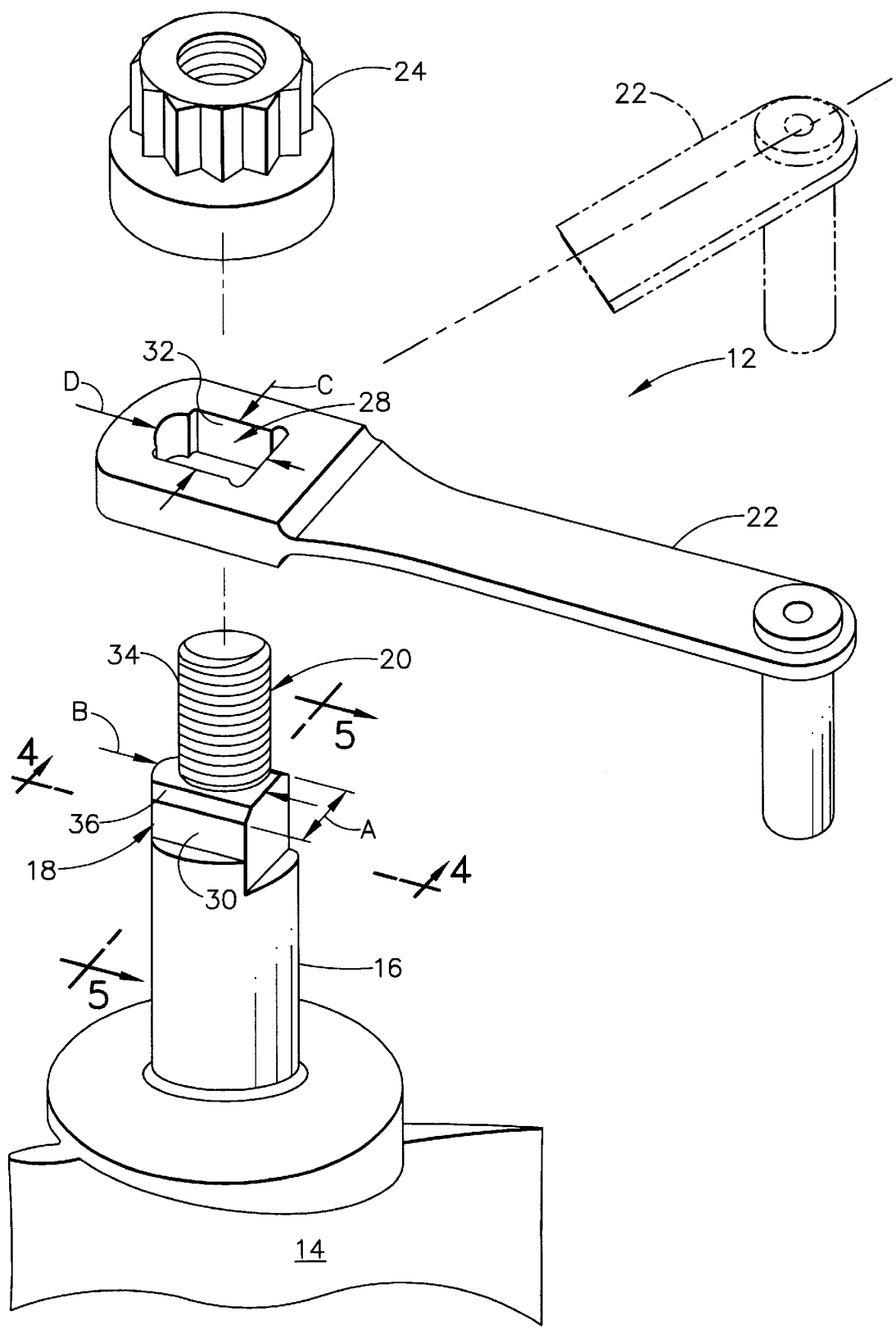
FIG. 3 is an exploded view of the variable stator vane illustrated in FIG. 1.

In order to selectively rotate the airfoil 14 during operation, the airfoil further includes a generally D-shaped seat 18 as illustrated in FIG. 2 which extends radially outwardly from the trunnion 16 as illustrated in more detail in FIG. 3. A threaded stem 20 extends radially outwardly from the seat and coaxially therewith around a radial axis of the engine.

As shown in more detail in FIG. 3, the stem 20 is cylindrical with a substantially constant outer diameter, whereas the seat 18 is unidirectional in an exemplary D-shaped configuration below the stem to provide a self-alignment feature for mounting a lever arm 22 atop the airfoil 14 for selective rotation thereof during operation. The lever 22 is secured to the airfoil by a threaded retaining nut 24, shown fully assembled in FIG. 1. Each lever 22 has a distal end, having a mounting pin for example, which cooperates with an annular actuation or unison ring 26 in a conventional manner for simultaneously rotating in unison each of the airfoils 14 in an individual compressor stage.

As shown in FIGS. 2 and 3, the lever 22 includes a proximal end having a mounting hole 28 which is also unidirectional in a generally D-shaped configuration being complementary with the corresponding seat 18 around which it is seated.

During assembly, the lever 22 is positioned atop the seat 18 as shown in FIG. 3, with the corresponding D-shaped seat 18 and mounting hole 28 allowing alignment therebetween solely in one matched direction, as shown in solid line, with all other orientations of the lever 22 atop the airfoil 14 being unmatched or misaligned, as shown in part phantom in FIG. 3 for example.

As indicated above in the Background section, it is desired to prevent engagement of the nut 24 atop the threaded stem 20 when the lever 22 is misaligned with the airfoil 14 to prevent the inadvertent torquing of the nut from damaging either the mounting hole 28 or the seat 18, or both.

In accordance with the present invention, a method of preventing mismatched assembly engagement of the lever 22 atop the seat 18 includes providing insufficient thread overlap between the nut 24 and the stem 20 to prevent threaded engagement therebetween during misalignment of the lever and vane, and providing sufficient thread overlap between the nut and stem to permit threaded engagement therebetween during alignment of the lever and vane.

This method is effected by providing means in the form of a suitable clearance between the seat 18 and the mounting hole 28 of the lever 22 at the aligned or matched configuration relative to the misaligned or unmatched configuration for permitting at least partial threaded engagement of the stem 20 and the nut 24. By preventing engagement of the nut 24 with the stem 20 when the lever 22 is misaligned, torque cannot be applied to the nut and no damage can be done. Only when the lever 22 is properly aligned with the airfoil 14 does sufficient thread overlap exist between the nut 24 and the stem 20 for permitting threaded engagement therebetween and the application of torque for completing the assembly.

More specifically, the seat 18 as illustrated in FIGS. 2 and 3 preferably includes a pair of opposite, parallel side flats 30 which define a width A of the seat. The seat 18 also has an arcuate front and a flat back which define therebetween a length B of the seat. The seat 18 is preferably narrower in width A than in length B.

Correspondingly, the mounting hole 28 includes a pair of opposite, parallel side walls 32 spaced apart at a width C. The mounting hole 28 also includes a generally arcuate front and a flat back which are spaced apart over a length D. The hole width C is less than the hole length D to correspond with the configuration of the seat 18 and allow alignment therebetween in solely the one matched engagement therebetween.

Figure 4:
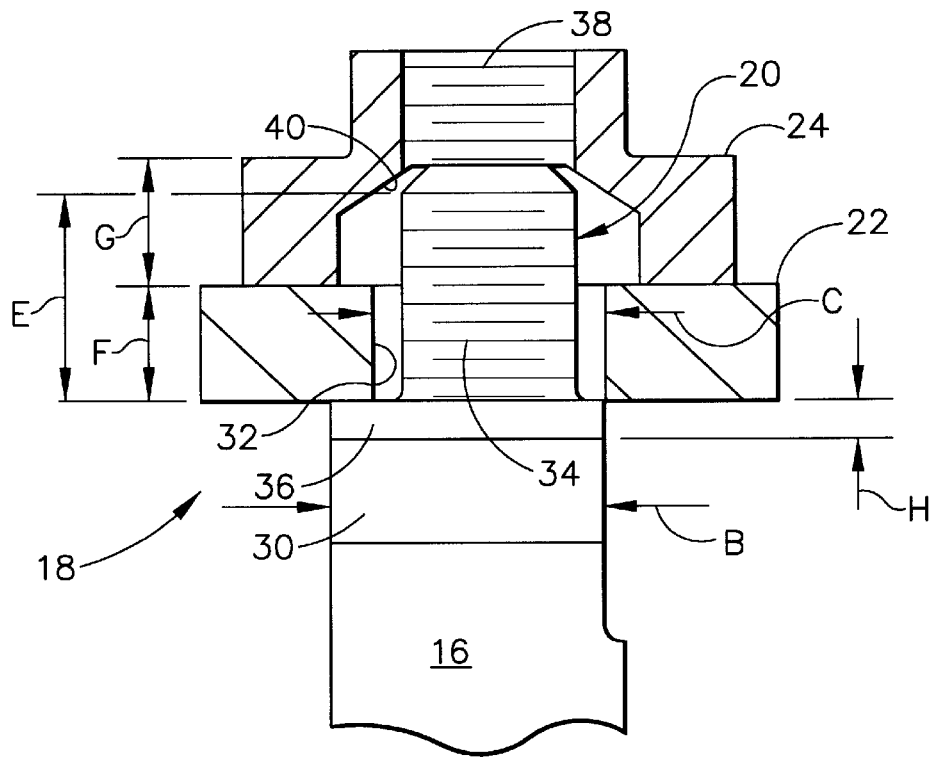
FIG. 4 is a partly sectional, elevational view of the outer portion of the variable vane illustrated in FIG. 3 during misalignment assembly of the lever atop its mounting seat and taken generally along line 4—4.
Figure 5:
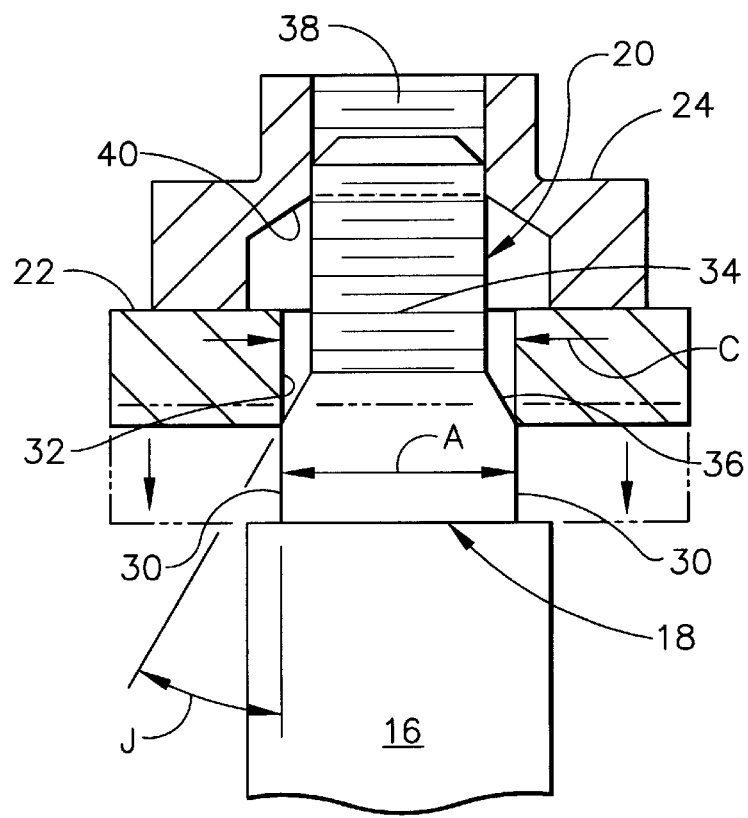
FIG. 5 is a partly sectional, elevational view of the outer portion of the variable vane illustrated in FIG. 3 during alignment assembly of the lever atop its mounting seat and taken generally along line 5—5.

The hole width C is preferably nominally equal to the seat width A to permit seating of the lever around the seat in alignment therebetween. The hole width C is also less than the seat length B to prevent seating therebetween when misaligned. An example of misalignment between the lever atop the seat 18 is illustrated in FIG. 4, and alignment therebetween is illustrated in FIG. 5, as well as in FIGS. 2 and 3.

In the matched orientation, the side walls 32 of the mounting hole may pass downwardly over the corresponding flats 30 of the stem. Correspondingly, the arcuate front of the mounting hole 28 passes downwardly over the arcuate front of the seat 18, and the flat back of the mounting hole passes downwardly over the flat back of the seat. In all other orientations of the lever 22 atop the seat 18, the D-shaped configurations of the mounting hole and seat prevent the lever 22 from being depressed atop the seat 18 with normal force.

As indicated above, the hole width C is preferably nominally equal to the seat width A in a preferred line-to-line contact having zero clearance with a suitable plus and minus manufacturing tolerance. This means that some levers 22 will have a positive side clearance allowing unrestrained assembly of the lever atop its corresponding seat, whereas other levers 22 will have a negative side clearance which prevents or restrains assembly of the lever atop the seat. In this latter situation, it is desired to prevent threading engagement of the nut 24 atop the stem 20 during misalignment of the lever 22 to prevent damage therebetween upon inadvertent torquing of the nut.

In accordance with the present invention, the nut 24 may threadingly engage the stem 20 only in the matched orientation of the lever 22 in alignment with the seat 18.

As shown in FIG. 4, the stem 20 has a height or length E of continuous threads 34 which is insufficient for threadingly engaging the nut 24 during the misalignment orientation illustrated. When misaligned, the bottom of the lever 22 merely sits atop the seat 18 in view of the narrower hole width C relative to the larger seat length B. However, by providing respective chamfers 36 atop corresponding ones of the seat flats 30, a radial or vertical clearance is provided therealong so that the same length E of stem threads 34 is also sufficient for engaging the nut 24 during the matched or aligned orientation as illustrated in FIG. 5, with the side walls 32 initially engaging the seat chamfers 36.

The chamfers 36 are preferably provided in the seat 18 and locally decrease the width of the seat 18 at its top where it joins the stem 20. The chamfers 36 are only provided on the flats 30 and not along the front or back of the seat. It is noted that chamfers may also be provided in the bottom of the mounting hole 28, but should be limited in extent to prevent an undesirable decrease in available load bearing area on the side walls 32.

As shown in FIGS. 2 and 3, the seat chamfers 36 are preferably flat and extend completely along the seat flats 30 between the arcuate front and flat back of the seat. The chamfers 36 therefore correspond with the matched orientation of the hole side walls 32 as shown in FIG. 5 so that when the lever 22 is placed atop the seat 18, it is permitted to drop an additional amount corresponding with a preferred number of overlapping threads between the stem 20 and the nut 24.

More specifically, and referring to FIG. 4, the lever 22 has a thickness F at the mounting hole which is less than the stem length E, and the nut 24 includes threads 38 for engaging the stem threads 34. And, the nut 24 also includes an unthreaded counterbore 40 disposed coaxially below its threaded portion.

The nut counterbore 40 has a height G, and the sum of the counterbore height G and the lever thickness F are collectively greater than the threaded stem length E to prevent threaded engagement of the stem and nut during misalignment.

The seat chamfers 36 have a height H as illustrated in FIG. 4, and the sum of the chamfer height H and the stem length E is collectively greater than the sum of the lever thickness F and counterbore height G collectively to permit threaded engagement of the stem and nut during alignment as illustrated in FIG. 5.

As illustrated in FIG. 4, when the lever 22 sits atop the seat 18 in misalignment, the stem thread length E is insufficient to engage the threads of the nut 24 placed atop the lever 22. The nut 24 therefore cannot possibly engage the threads of the stem which prevents the inadvertent misalignment assembly of the lever and the airfoil.

However, when the lever 22 is rotated atop the seat 18 into the single matched or aligned orientation shown in FIG. 5, the lever 22 may drop the additional clearance amount up to the height H of the chamfers which exposes additional stem threads atop the lever 22 and allows the nut 24 to be turned to initially engage the top thread portions of the stem 20. The nut 24 may then be additionally turned and torqued atop the lever 22 engaging additional threads and driving the lever 22 downwardly over the seat flats 30, irrespective of interference therebetween, until the lever 22 bottoms atop the trunnion 16 as shown in phantom in FIG. 5.

As shown in FIG. 5, the chamfers 36 have a chamfer angle J which is in the exemplary range of about 5° to about 7°. The smaller the chamfer angle, the more vertical clearance H will be provided. However, the various dimensions of the assembly, including the seat width A and hole width C, are subject to typical manufacturing tolerances such as about plus or minus 0.5 mils (0.0127 mm).

Similarly, manufacturing tolerances are also found for the chamfer angle J and the associated chamfer height H. These various dimensions may be selected in compromise to maintain a close tolerance fit between the mounting hole 28 and the complementary seat 18 while providing insufficient thread overlap in the misaligned orientation and sufficient thread overlap in the matched and aligned orientation.

In a preferred embodiment, the stem and nut threads 34,38 have a common pitch selected for initially engaging at least about one and a half threads during the matched, alignment orientation illustrated in FIG. 5 before the nut is torqued down. In this way, sufficient torque may then be exerted on the nut and reacted through the initial one and a half thread engagement with the stem to overcome interference friction between the side walls 32 and the seat flats 30 without damaging the threads. Increasing the number of initial thread overlap requires a corresponding increase in the vertical clearance H provided by the chamfers 36, which correspondingly increases the side clearances between the mounting hole 28 and the seat 18 which is undesirable.

A combination of the unidirectional seat 18, limited stem thread length E, and limited vertical clearance H provided by the chamfers 36 effects both insufficient thread overlap when the lever 22 is misaligned as well as sufficient thread overlap when the lever is properly aligned. The nut counterbore 40 cooperates with this dual-orientation design and accommodates the exposed portion of the seat 18 upon bottoming of the lever 22 and allows a suitable number of nut threads 38 for reacting the retention loads carried by the nut.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claim.

I claim:

1. A mismatch proof variable stator vane comprising:
   an airfoil having a threaded stem;
   a lever having a mounting hole receiving said stem;
   a nut threadingly engaging said stem to retain said lever on said airfoil; and
   means for providing insufficient thread overlap between said nut and stem to prevent threaded engagement therebetween during misalignment of said lever and vane, and for also providing sufficient thread overlap between said nut and stem to permit threaded engagement therebetween during alignment of said lever and vane.

2. A variable stator vane comprising:
   an airfoil having a trunnion for pivotally mounting said airfoil to a stator casing, a seat extending from said trunnion, and a threaded stem extending from said seat;
   said seat having a pair of opposite parallel flats and respective chamfers thereatop, and being narrower in width between said flats than in length along said flats;
   a lever including a mounting hole disposed on said seat and being complementary therewith, said hole being defined by a pair of opposite side walls spaced apart at a width being less than a length of said hole;
   a nut threadingly engaging said stem to retain said lever atop said airfoil; and
   said hole width being nominally equal to said seat width to permit seating of said lever around said seat in alignment therebetween, and being less than said seat length to prevent said seating in misalignment therebetween, with said stem having a length of threads thereon insufficient for threadingly engaging said nut during said misalignment, and sufficient for threadingly engaging said nut during said alignment with said hole side walls initially engaging said seat chamfers.

3. A vane according to claim 2 wherein said seat includes an arcuate front and a flat back bounding said flats, and said chamfers extend therebetween.

4. A vane according to claim 3 wherein:
   said lever has a thickness at said mounting hole less than said stem length; and
   said nut includes threads for engaging said stem threads, and an unthreaded counterbore disposed therebelow.

5. A vane according to claim 4 wherein said counterbore has a height, and said counterbore height and said lever thickness are collectively greater than said stem length to prevent threaded engagement of said stem and nut during said misalignment.

6. A vane according to claim 3 wherein said seat chamfers have a height, and said chamfer height and said stem length are collectively greater than said lever thickness and counterbore height collectively to permit threaded engagement of said stem and nut during said alignment.

7. A vane according to claim 6 wherein said chamfers have a chamfer angle of about 5° to about 7°.

8. A vane according to claim 6 wherein said stem and nut threads have a pitch for engaging at least about one and a half threads during said alignment.

9. A method of preventing mismatched engagement of a nut-retained lever atop a threaded stem of a variable stator vane comprising:
   providing insufficient thread overlap between said nut and stem to prevent threaded engagement during misalignment of said lever and vane; and providing sufficient thread overlap between said nut and stem to permit threaded engagement therebetween during alignment of said lever and vane.

10. A method according to claim 9 further comprising:

providing a unidirectional seat below said stem, and a complementary mounting hole in said lever alignable solely in one matched direction; and providing clearance between said seat and lever during said alignment relative to said misalignment for permitting at least partial threaded engagement of said stem and nut.

* * * * *